(12) United States Patent
Forssell et al.

(10) Patent No.: US 7,936,760 B2
(45) Date of Patent: May 3, 2011

(54) METHOD, COMMUNICATIONS NETWORK ARRANGEMENT, COMMUNICATIONS NETWORK SERVER, TERMINAL, AND SOFTWARE MEANS FOR SELECTING AND CHANGING OPERATING MODES FOR PACKET-SWITCHED VOICE CONNECTION

(75) Inventors: Mika Forssell, Espoo (FI); Arto Karppanen, Helsinki (FI); Kari Aaltonen, Jarvenpaa (FI)

(73) Assignee: Nokia Corporation, Espoo (FI)

( * ) Notice: Subject to any disclaimer, the term of this patent is extended or adjusted under 35 U.S.C. 154(b) by 1419 days.

(21) Appl. No.: 10/391,409

(22) Filed: Mar. 18, 2003

(65) Prior Publication Data
US 2004/0184461 A1 Sep. 23, 2004

(51) Int. Cl.
*H04L 12/56* (2006.01)
(52) U.S. Cl. .................. 370/395.2; 370/395.21
(58) Field of Classification Search ............... None
See application file for complete search history.

(56) References Cited

U.S. PATENT DOCUMENTS

| | | | | |
|---|---|---|---|---|
| 5,790,176 A * | 8/1998 | Craig | ............ | 725/115 |
| 6,009,325 A * | 12/1999 | Retzer et al. | .............. | 455/434 |
| 6,459,776 B1 * | 10/2002 | Aktas et al. | ............... | 379/88.13 |
| 6,473,467 B1 | 10/2002 | Wallace et al. | ............. | 375/267 |
| 6,781,962 B1 * | 8/2004 | Williams et al. | ............. | 370/259 |
| 6,823,005 B1 * | 11/2004 | Chuang et al. | ................ | 375/227 |
| 2002/0087674 A1 * | 7/2002 | Guilford et al. | ............. | 709/223 |
| 2003/0039237 A1 * | 2/2003 | Forslow | ........................ | 370/352 |
| 2003/0060210 A1 * | 3/2003 | Ravishankar et al. | ........ | 455/452 |
| 2004/0088167 A1 * | 5/2004 | Sartini | ...................... | 704/270.1 |

FOREIGN PATENT DOCUMENTS

| | | | |
|---|---|---|---|
| EP | 0 915 596 A2 * | 5/1999 | |
| EP | 0 949 832 A1 * | 10/1999 | |
| EP | 1096813 A2 * | 5/2001 | |
| WO | WO-97/26764 A1 * | 7/1997 | |
| WO | WO-02/51177 A1 * | 6/2002 | |

OTHER PUBLICATIONS

Wikipedia on "Streaming media", retrieved Aug. 25, 2010.*
3$^{rd}$ Gen. Partnership Project; Tech Spec Grp GSM/EDGE Radio Access Network; General Packet Radio Service (GPRS); Mobile Station (MS)-Base Station System (BSS) interface; Radio Link Control/Medium Access Control (RLC/MAC) protocol (Release 4); 3GPP TS 44.060 V5.0.0 (Feb. 2002).*

* cited by examiner

*Primary Examiner* — Ayaz R Sheikh
*Assistant Examiner* — Blanche Wong
(74) *Attorney, Agent, or Firm* — Harrington & Smith

(57) ABSTRACT

The invention relates to a method for selecting or changing communications modes used by a terminal on a communications connection over a packet-switched data network where the communications mode can be based on either real-time or non-real-time transfer and where the service capacity varies locally or temporally. The invention further relates to a communications network arrangement utilizing the method, a communications network terminal, and a software means stored at a terminal.

23 Claims, 3 Drawing Sheets

METHOD, COMMUNICATIONS NETWORK ARRANGEMENT, COMMUNICATIONS NETWORK SERVER, TERMINAL, AND SOFTWARE MEANS FOR SELECTING AND CHANGING OPERATING MODES FOR PACKET-SWITCHED VOICE CONNECTION

BACKGROUND OF THE INVENTION

The invention relates to a method for selecting or changing communications modes used by a terminal on a communications connection over a packet-switched data network where the communications mode can be based on either real-time or non-real-time transfer and where the service capacity varies locally or temporally. The invention further relates to a communications network arrangement utilizing the method, a communications network server, a cellular terminal, and a software means stored at a terminal.

Circuit-switched bi-directional so-called duplex voice connections over telephone networks have been commonplace for over 100 years. People communicating over a voice connection can speak and listen to one another simultaneously because the communications link is active in both directions continuously. As one party stops speaking, the other party can continue at any desired point of time because the circuit-switched connection is not cut off during the call. The connection is terminated only when the parties so decide. As far as data communication is concerned a circuit-switched connection is relatively inefficient as it reserves a communication link also at those time when there is no data to be communicated.

Data connections, just as voice connections, are increasingly turning from circuit-switched connections into packet-switched connections. One advantage of packet-switched networks is the efficient use of communications resources. The best known packet-switched network among users is the Internet. Another known packet-switched service/network is the GPRS (General Packet Radio Service) which was originally created to serve data communication needs. In a GPRS network, a communications connection between two terminals is established only when there exists a need to transfer data. Such a connection thus resembles a so-called simplex connection known from the prior art. An individual communications connection operates only in one direction at a time, either downlink towards the terminal, or uplink towards the backbone network. In GPRS, however, a terminal may have simultaneous uplink and downlink connections. When the need to communicate ceases completely or when there are momentarily no more data packets to transmit, the dedicated channel used is removed. If necessary, this release of the link can be delayed by a few hundred milliseconds typically.

Voice communication over a packet-switched GPRS network requires the utilization of several different communications protocols. Such required communications protocols include, for instance, the RTP (Real Time Protocol), UDP (User Datagram Protocol), and IP (Internet Protocol). Of these, the RTP is the one that sees to that voice packets are delivered in the correct order and with as short delay as possible to the receiving terminal.

A conversation between two people usually proceeds in 'bursts'. Therefore, breaks in speech spurts or a changeover from one speaker to another may result in a break in the data transfer. A changeover between speakers additionally always involves a reaction time from the part of the person who was listening, before he starts talking himself, which may result in a situation in which the dedicated channel reserved for the preceding speech burst is already released a few hundred milliseconds after the preceding speech burst. Termination of a radio link in a conventional GPRS network is controlled using a so-called TBF procedure (Temporary Bit Flow). In TBF, a dedicated channel can be maintained for a while after a break in the data transferred. So, when data run out in the memory of the transmitting terminal, the TBF procedure typically releases the dedicated channel in a few hundred milliseconds.

If, however, a new dedicated channel for new data to be transferred is required in this situation, it must be established through a slower process by first utilizing a common control channel of the GPRS network. This takes several hundred milliseconds. At worst this chain of events, disconnection and re-connection, may cause pauses of 0.5 to 1.5 seconds over the connection, which pauses are perceived by the user. These pauses substantially affect the user's communication.

In the TBF procedure of the GPRS service it is possible to increase the TBF release delay in both directions, uplink and downlink. This can be done in an attempt to improve the functionality of the GPRS network for voice connections. In the downlink direction a so-called delayed TBF procedure is used, and in the uplink direction, a so-called extended TBF procedure. A typical TBF release delay is of the order of 1000 to 2000 ms. With these procedures, the link between the terminal and base station can be maintained for a while without data being transferred. A longer TBF release would result in the battery of the terminal to discharge quickly.

The basic service capabilities of GPRS networks vary a lot. In some GPRS networks with a good performance the users can be guaranteed almost real-time streaming mode voice connections. In such connections, speech is buffered at the receiver into blocks of 0.5 seconds at most before being played back to the user. In this kind of GPRS networks the service level of the connection must be well defined and controlled. In such networks the terminals and the network agree on the Quality of Service (QoS) level before the actual establishment of the connection. Communication parameters to be agreed upon may include e.g. the maximum allowable latency time between terminals, the communications capacity required on the link, or the quantity of errors allowed. In the provision of the QoS required for the streaming mode in GPRS networks, problems are especially caused by radio path fade-outs or momentary network overloads which may cut off the communication link or force serving cell handovers in rapid succession.

Currently, however, there are many GPRS networks that for some reason or another are not capable of the functionality required by the QoS service described above. The reason may be that some necessary function is missing or that the communications capacity of the network is insufficient in general. In such GPRS networks, a certain amount of speech, say 5 seconds, is first stored in a buffer memory at the receiver's terminal from where it is then played back to the receiver. This is a non-real-time store-and-play mode. Such a voice connection cannot be a duplex voice connection but, instead, each user must be ready to adapt to even relatively long delays before starting their own speech spurt or hearing the answer. From the user's point of view this is an undesirable feature which should be avoided when possible. The store-and-play connection or service is not susceptible to problems associated with the streaming mode. Therefore it can be always used in any GPRS network in any kind of communications conditions.

One possible connection set-up technique in a packet-switched GPRS network is a so-called PoC session (Push to talk over Cellular). Several people may participate simultaneously in a PoC session and they can communicate through speech or SMS messages. The participants take turns speaking, and the direction of transmission varies. A PoC session can utilize either one of the connection techniques described above. Naturally, from the point of view of the user, the streaming mode connection/service is the more desirable one. The PoC service will hereinafter be called VSS (Voice Streaming Service) in this patent application in order to reflect the fact that the primary operating mode of a voice connection is to utilize the streaming mode service.

When it is desired to establish a real-time voice connection, such as a VSS, there cannot be certainty about whether the serving GPRS network in its completeness is able to support the QoS required. The problem is particularly emphasized at the B subscriber's, or the receiving, terminal which has to adapt to that which is provided to it by the serving network. Even if the sending terminal, A subscriber, were able to transmit using streaming mode, a poor service quality in the rest of the network may force the receiver, B subscriber, to receive according to the store-and-play mode. A connection may be attempted based on the assumption that the GPRS network as a whole supports real-time VSS. If this is not the case, the user of the terminal must suddenly adapt to an alternative and undesirable situation. On the other hand, if the network in question supports streaming mode in VSS, and the user does not know that, he may default to use a service according to the store-and-play method. It can be assumed, however, that users want to use streaming mode with voice connections. Unfortunately, GPRS networks according to the prior art are still relatively bad performers as regards functionality for voice connections.

SUMMARY OF THE INVENTION

An object of the present invention is to provide a method and network arrangement by means of which users in packet-switched and at least partly wireless networks can be provided with a primary option of using streaming mode in VSS.

The objects of the invention are achieved by a method and network arrangement in which a terminal together with the communications network examines, prior to the connection establishment proper, the ability of the whole link to support various VSS services. If streaming mode is possible, it is the primary, or preferred, operating mode. Secondarily or on the user's demand a voice connection according to the store-and-play technique is used.

An advantage of the invention is that in packet-switched networks, streaming mode service can always be provided as the preferred service if the communications network can provide it.

Another advantage of the invention is that if the user so desires, he can also choose a service according to the store-and-play technique.

A further advantage of the invention is that during a communications session which has been established it is possible to change the service mode if such a change is required by the conditions.

A method according to the invention for selecting or changing operating modes in a packet-switched network is characterized in that the decision about the operating mode applied at a terminal is made after a connection request on the basis of information describing the requested communications connection.

A communications network according to the invention is characterized in that the communications network comprises a means for making a decision about the operating mode to be applied following a connection request for each terminal to be connected to the communications session.

A terminal according to the invention is characterized in that the terminal comprises a means for receiving information describing a communications connection from the serving network and from a server controlling a given service in the network, and a means for making a decision about the operating mode on the basis of the information received.

A server according to the invention operating in a packet-switched network is characterized in that it further comprises a means for transmitting information stored on the server, describing the quality of a communications connection, to at least one terminal connected to a communications connection in order to select or change the operating mode of the communications connection.

A software means according to the invention is characterized in that the software means can be used to implement a step to receive connection information of the serving network, a step to receive from a server connected to a network information describing the whole requested communications link, a step to test whether the service capacity of the network is sufficient for the requested service, and a step to connect said service.

Some preferred embodiments of the invention are specified in the dependent claims.

The basic idea of the invention is as follows: A packet-switched data network providing streaming mode service, such as a GPRS network providing VSS, includes a server assisting the VSS, a VSS server. This VSS server gathers information about the functioning of the packet-switched network and communications conditions in the various parts of the network. When a terminal A connected to the network wants to establish a voice connection with a second terminal B, it receives, during the connection set-up, information from its base station concerning the link between the base station and the terminal A. This information is advantageously sent to the VSS server as well. Conversely, the VSS server advantageously sends to the requesting terminal A also network information describing the rest of the link from the base station serving A to the receiving second terminal B. The terminal can utilize the information received to determine and control its operating mode. For instance, based on the information, the terminal A can determine whether streaming mode can be used on the requested link or not. The VSS server sends the information to the second, receiving, terminal B which for itself can determine the best receiving method currently available. With the method according to the invention the users of terminals A and B can be indicated during the connection set-up which kind of a communications connection can be established between them.

BRIEF DESCRIPTION OF THE DRAWINGS

The invention will now be described in detail. The description refers to the accompanying drawings in which.

DETAILED DESCRIPTION

Now it will be discussed, by way of example, the utilization of the method according to the invention in a GPRS network. The explanatory embodiments describing the invention show how it is possible to change between streaming mode and store-and-play mode at a terminal. Naturally, the inventional idea may also be applied to other procedures, too, used by a terminal to secure or improve a communications connection. Furthermore, it is obvious to a person skilled in the art that the method discussed here can be applied also in other packet-switched networks in which a real-time communications connection can be utilized.

Figure 1A:
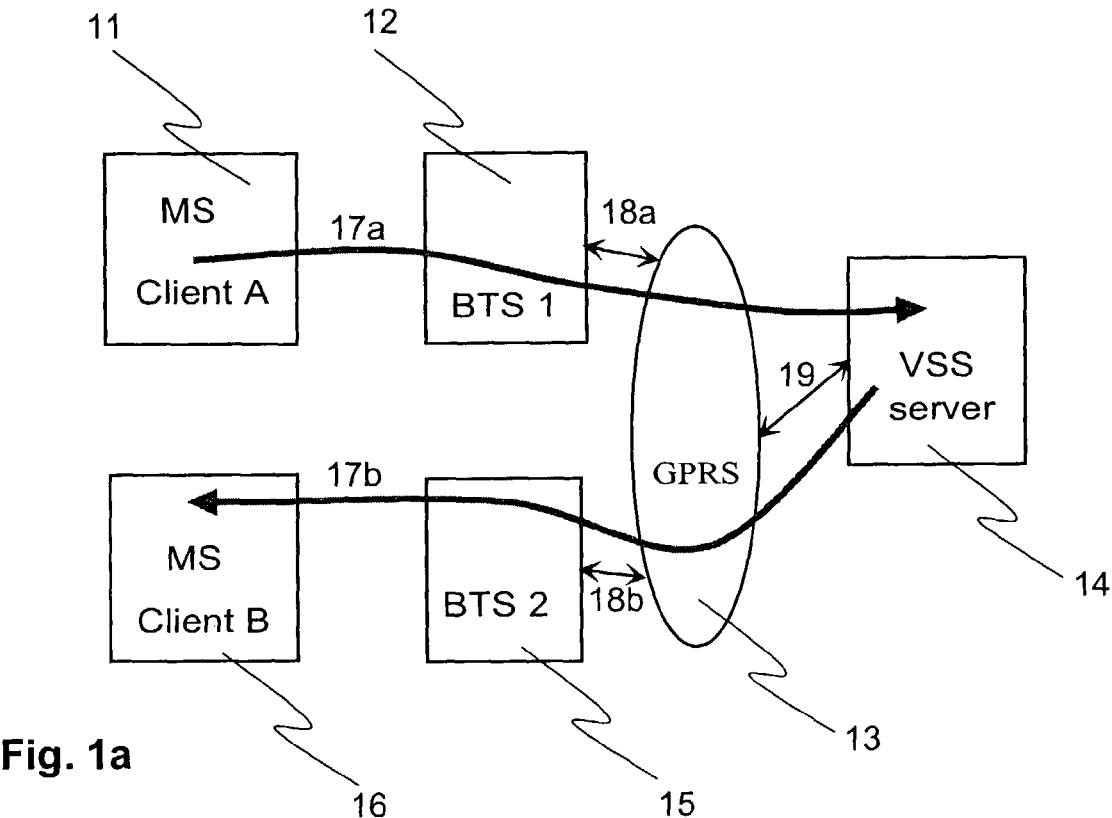
FIG. 1a shows, as an example, a communications network employing the method according to the invention.

FIG. 1a shows, as an example, a network arrangement which can utilize the method according to the invention. However, FIG. 1a only shows those parts that are essential as far as utilization of the invention is concerned. Reference designator 13 represents a GPRS backbone network capable of providing both streaming mode and store-and-play service. For clarity, two base stations BTS 1, reference designator 12, and BTS 2, reference designator 15, have been drawn separate from the network. Base station BTS 1 is connected with the rest of the GPRS network through a fixed communications connection 18a. Similarly, the other base station BTS 2 is connected with the rest of the GPRS network through a second fixed communications connection 18b. Reference designator 11 represents a first voice communication terminal MS A, and reference designator 16 represents a second terminal MS B which is wirelessly connected with the second base station BTS 2. The GPRS network 13 further includes a VSS server, reference designator 14, connected with the GPRS backbone network 13 through a fixed communications connection 19.

Arrow 17a represents voice data transmitted from the first terminal MS A. They are first directed via a wireless link to the base station BTS 1 from which they are directed over connection 18a to the GPRS backbone network 13. Advantageously also the VSS server 14 takes part in the voice data control. From the GPRS backbone network 13 the voice data are directed via a communications connection 18b to the second base station BTS 2. From the base station BTS 2 the voice data are transmitted via a wireless link to the second, receiving terminal MS 2. Reference designator 17b represents this transmission of the voice data to the terminal MS 2.

In the example of FIG. 1a the terminal MS A makes an initiative to establish a communications connection and use a VSS service. Before the actual establishment of the connection the terminal MS A and the GPRS network exchange messages via a base station BTS 1, which messages contain information about the performance of the cellular network used by the terminal MS A. Thus it is obtained information about the QoS level of the local GPRS network, information about whether the delayed TBF and/or extended TBF are used in the cell, information about the current load in the GPRS network, and information about the level of quality of the radio link of the cell and error ratio of packets transmitted. Based on this information it is possible to preliminarily determine whether or not the serving GPRS network can support real-time streaming mode which is more critical as regards data communications. When just acting as the transmitting party, the terminal A advantageously always uses the most efficient/best possible transmission mode.

During the above-mentioned connection establishment process the terminal MS A advantageously is registered on a VSS server 14 whereby it is at the same time joined to the desired conversation group. In conjunction with the registering, updated connection parameters of the communications connection between the terminal A and network are stored on the VSS server. At this point, the terminal MS A advantageously receives additional information via the VSS server 14 about the rest of the network for the selection of the connection mode. Such information includes e.g. indication of the connection modes currently available to the other participants or how long a buffer time it is recommended to use in the non-real-time store-and-play technique. A GPRS network used by one or more participants may be limited in its capacity. The VSS server 14 knows this and sends information about it to the terminal MS A. Advantageously the VSS server 14 also knows the service levels of all other participating service operators as well as the potential limitations. Conversely, the VSS server 14 forwards the connection information relating to MS A advantageosly to the other terminals communicating with the terminal MS A.

Advantageously the network sends information about the cell serving the receiving terminal, such as e.g. the bit error rate or the capacity available, to the receiving terminal always when a downlink is being established for the terminal.

The VSS server 14 takes care that the terminals, both A and B subscribers, always get up-to-date information about the communications conditions in the GPRS network. The service operators can store their individual network configurations and recommended operating modes at the VSS server because the operators know the capabilities of their networks. The operating mode recommended by the network operator, or information on the basis of which the operating mode is decided, is advantageously sent by the VSS server 14 to each terminal in conjunction with the registering on the PoC service and/or when the PoC call/session is actually started. If the VSS server 14 advantageously tells to the terminal the operating mode recommended by the serving operator, the terminal itself need not examine the capacity of the network any more but the terminal can trust this information, sent by the VSS server 14, describing the recommended operating mode in the communications network. Therefore the information available to the terminal need not be updated when the performance of the network is improved, but the operating mode will be automatically chosen optimal. Thus, operating mode would be primarily determined by the operators.

To the receiving, or B, subscriber the VSS server 14 may advantageously send information describing the communications capacity of the network used by the A subscriber, such as e.g. how long a latency time and what kind of transfer rate is to be expected. If, for example, extended UL TBF is used on the A subscriber's side, the inter-packet delays are minimal. If said method is not used, there may be a 1.5-second pause between two packets in the worst case. This is because the A subscriber's UL TBF procedure releases the uplink used, and it must be re-established prior to sending the next packets.

Receiving terminals, B subscribers, always try to utilize streaming mode if it is possible according to the information available to them. If communications conditions do not allow streaming mode, the information received by the terminals can be used e.g. to determine the required voice sample buffering in the store-and-play method.

In addition, the VSS server 14 gathers continually information about how well the GPRS network as a whole can support the service selected over a connection. Thus, if in the GPRS network a situation occurs at some point of time where the network is not able to support e.g. the streaming mode selected by the users, the VSS server 14 immediately informs all the appropriate terminals about this situation. The terminals or users can then take this into account in their own communication.

In a preferred embodiment of the invention, the idea of the invention is utilized in such a manner that the VSS server controls the terminals in the GPRS network to select the most appropriate operating mode in current communications conditions. In this embodiment the terminals follow instructions given by the VSS server.

In another preferred embodiment of the invention a terminal MS A sends its connection information describing the operation of the GPRS network directly or via the VSS server 14 to a second, receiving terminal MS B. In this case the receiving terminal MS B is able to determine the connection mode to be used on the basis of received information concerning terminal MS A and cell-specific information received from base station BS 2. Thus the B subscriber can make the decision about the receiving mode completely in real-time.

In the method according to the invention the communications mode can be changed from streaming mode to store-and-play mode or vice versa in any one of the following manners. A terminal 11 or 16 automatically makes the change if the communications conditions change, and it only informs the user of the terminal about the change made. Alternatively, the need for change is initially indicated to the user who must either accept or reject the suggested operating mode. In a third method the user of the terminal selects the desired operating mode. The terminal 11 or 16 finds out whether or not the GPRS network is able to provide the service desired by the user. If for some reason or another the network cannot provide the quality of service required, the terminal chooses an operating mode that can be applied. The user of the device can be informed about this selection.

Figure 1B:
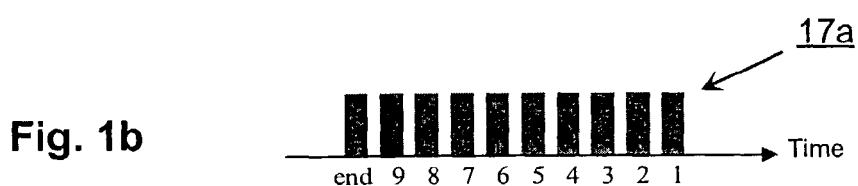
FIG. 1b shows, as an example, data transmitted using streaming mode.
Figure 1C:
FIG. 1c shows, as an example, data played back using streaming mode.
Figure 1D:
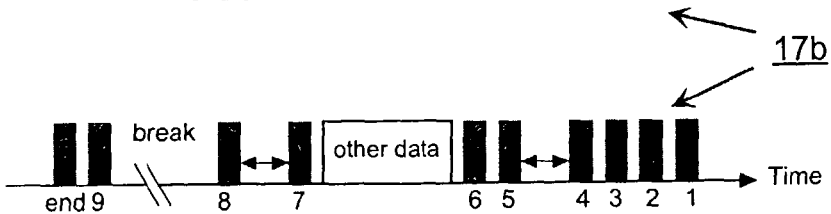
FIG. 1d shows, as an example, data played back using the store-and-play method.

FIGS. 1b, 1c and 1d illustrate stages of the communications process described above when a VSS service is required. A transmitting terminal MS A uses streaming mode in its transmission, which is the best possible transmitting method at the moment depicted in FIG. 1b for said A subscriber. FIG. 1b shows voice sample data transmitted by terminal MS A. It comprises all in all nine voice samples 1-9 of sixty octets and a data packet indicating the end of a voice sample, which all are transmitted at intervals of about 60 ms.

FIG. 1c shows a situation when a second, receiving terminal MS B is receiving said data packets (B subscriber). When a downlink is established to the terminal B, it makes a decision about the best possible operating mode on the basis of information received from the network and VSS server. In the example of FIG. 1c it means streaming mode, for in this example voice data according to the VSS service are transferred privileged in the GPRS network in which the QoS is supported. In such a GPRS network other possible data are transferred only after the privileged VSS data has been transferred to the second terminal MS B or when the transfer thereof will not interfere with the transfer of the VSS data. Although there is slight variation in the receive times of the packets received, such as between packets 4 and 5, and 7 and 8, the received voice data packets can be reproduced in the correct order and with correct timing by means of a small receive buffer of the order of ten data packets. From the users' point of view, the connection operates in real-time in streaming mode.

FIG. 1d shows a situation in which a part of the GPRS network cannot support the desired QoS. The situation is thus somewhat different than that depicted in FIG. 1c. The transmitting terminal A still transmits in the mode which is the best possible one for itself, i.e. the streaming mode. Now, in some part of the GPRS network, the VSS data do not have the privileged position any more. So, in the example of FIG. 1d, some other data are being sent in between packets 6 and 7. Likewise, in between packets 8 and 9 there has occurred an unexpected break e.g. due to congestion or a poor radio link. For such a connection, streaming mode cannot be used in reception, but the receiver must resort to store-and-play. With the arrangement according to the invention, this situation can be seen in advance during the establishment of the downlink, and therefore the receiving terminal is always able to determine the best possible receive method.

Using a sufficiently large receive buffer in the receiving terminal MS B, voice packets received discontinuously and at irregular intervals can be reproduced continuously in sequences of certain length. For example, if streaming mode is initially used for voice, and the A subscriber does not have extended UL TBF functionality, there may be a pause of up to 1.5 seconds between two received packets because the uplink of the A subscriber is released and it must be re-established. Therefore, voice buffering of a few hundred milliseconds is not enough for the B subscriber, but the buffering time has to be continued.

Advantageously the receiving terminal thus adapts its buffering length to the current communications conditions. It may use e.g. 800-ms or 1500-ms buffering, depending on the need. A sort of extreme case is the storing of the whole voice burst in the buffer from which it is played back in one whole after it has ended.

Alternatively, the VSS server 14 controls the B subscriber to utilize the buffering lenght most suitable at that moment.

A change in the performance of the GPRS network may cause a change in the playback mode also in the middle of voice transfer in progress. If the playback mode is changed from streaming mode to store-and-play, it usually causes one pause in speech, but sufficient buffering at the terminal prevents following breaks.

Figure 2:
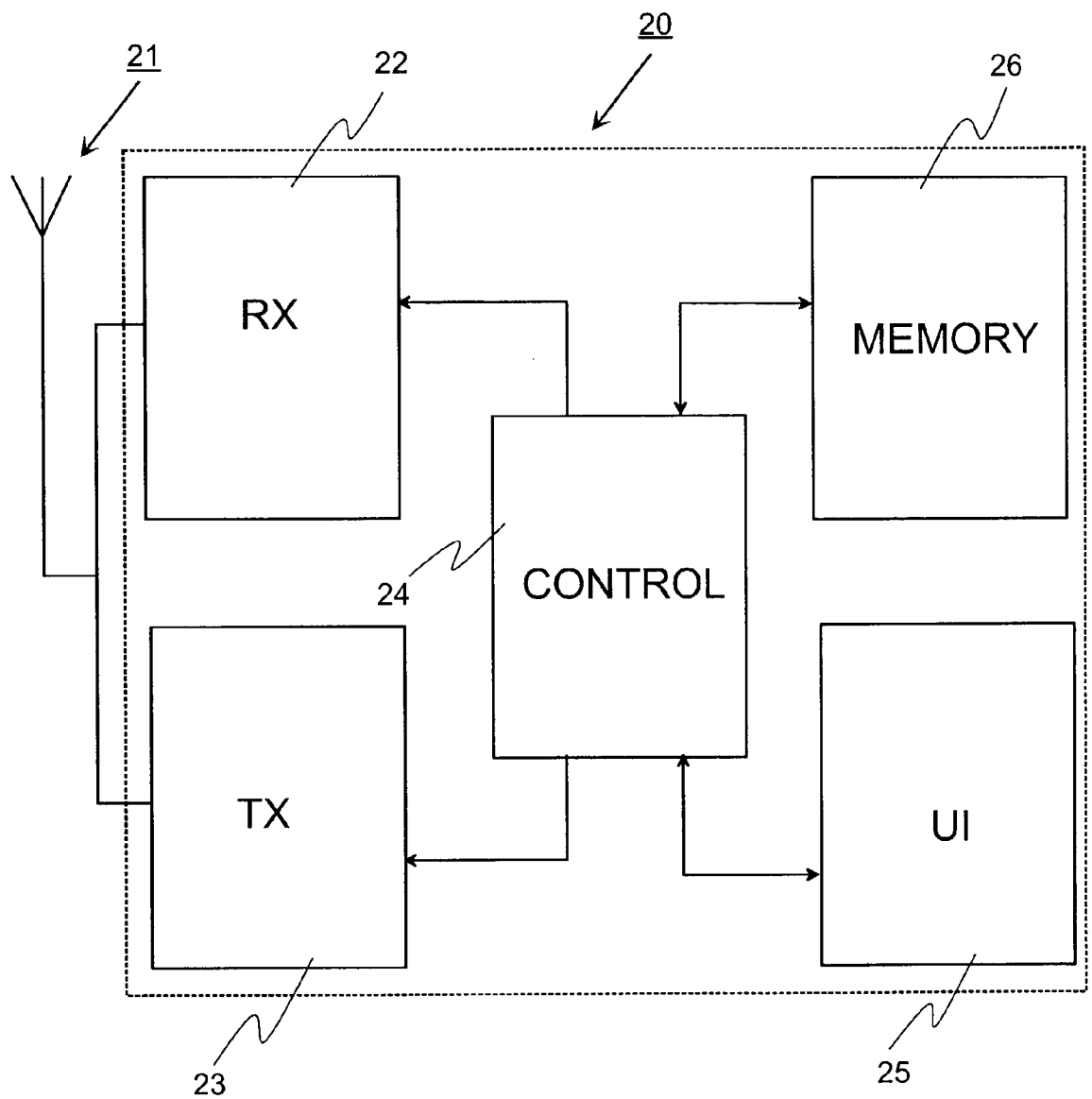
FIG. 2 shows, as an example, a cellular terminal applying the method according to the invention.

FIG. 2 shows, as an example, main parts of a cellular terminal 20 employing the method according to the invention. The terminal 20 utilizes an antenna 21 in transmitting and receiving packets. Reference designator 22 represents the means constituting a receiver RX by which the wireless terminal 20 receives packets from the GPRS network 13. The receiver RX comprises the means according to the prior art for all received packets.

Reference designator 23 represents the means that constitute the transmitter TX in the wireless terminal. The transmitter means 23 perform on the signal to be transmitted all the necessary signal processing measures required when communicating with a GPRS network 13.

From the point of view of the invention, the crucial functional unit in the terminal is the control unit 24 which controls the operation of the terminal 20. It controls the operation of all the main component parts belonging to the terminal 20. It controls both the receive and transmit functions. It determines on the basis of information received from the GPRS network 13 which method will be used on the communications connection. In the arrangement according to the invention, the control unit 24 determines when it will be received or transmitted data packets containing streaming mode voice samples and when strore-and-play voice sample packets. The control unit 24 also controls the playback of the voice samples received both in the streaming mode and in the store-and-play mode on speaker means (not shown) belonging to the user interface 25. It is further used to control the user interface UI 25 as a whole and the memory 26 of the terminal.

The software application required by the control unit 24 in the operation according to the invention advantageously resides in the memory 26.

The user interface 25 is utilized by the user of the terminal 20 in controlling the functions of the terminal. Through the user interface the user can advantageously define the desired mode of connection. Correspondingly, the terminal can use the user interface to inform the user about the ability of the GPRS network 13 to provide the service required by the user.

Figure 3:
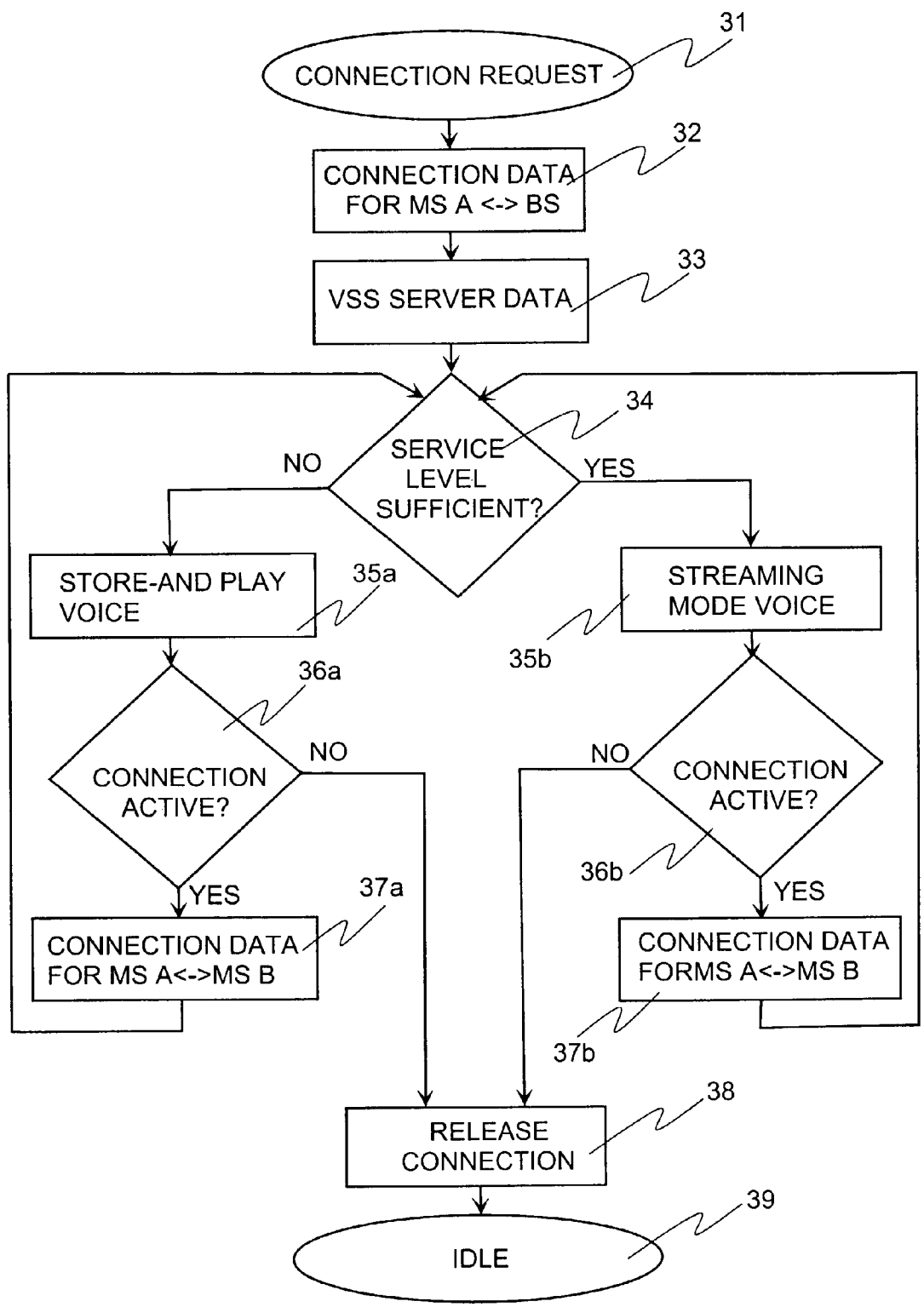
FIG. 3 shows, as an example, a flow chart including main stages of the method according to the invention on a packet-switched communications connection.

FIG. 3 illustrates in the form of an exemplary flow chart the main stages of the method according to the invention in an embodiment in which the terminal plays an active role in the decision-making. In step 31 the terminal 11 or 16 makes a VSS service connection request to a GPRS network 13. In its request the terminal indicates a voice connection and the terminal with which it wants to communicate.

In conjunction with messages exchanged during the connection set-up the requesting terminal is sent mainly information concerning its own cell, step 32. At this point the terminal 11 or 16 receives information about e.g. whether its own cell supports the QoS service, the traffic class to be used, and what kind of TBF can be used in the cell. On the basis of the information received the terminal 11 or 16 can determine the capacity of the serving GPRS network.

In step 33 which is part of the establishment of the connection, a VSS server 14 connected with the GPRS network 13 gives out information about the capacity of other network elements belonging to the communications connection required. In step 34 the transmitting terminal makes a decision, based on the information received, about the communications mode to be utilized in the different directions of transfer. In its transmit function the terminal of the A subscriber defaults to the streaming mode if only permitted by the communications conditions.

The receiving terminal, B subscriber, advantageously receives the information describing its own cell and operation of the GPRS network when the downlink toward this terminal is being established, steps 32 and 33. It advantageously receives the GPRS network information either from the VSS server 14 or directly from the transmitting terminal. Information required in the method according to the invention can also be sent to the terminal in the broadcast messages of its own cell. In all above-mentioned cases the receiving terminal can in step 34 make an independent decision about the receive method.

If the capacity of the whole GPRS network is sufficient for streaming mode and the user of the terminal has indicated that he or she wants to use streaming mode, the terminal, transmitting or receiving, goes into streaming mode, step 35*b*. If, based on the information received, the GPRS network is not providing sufficient capacity for streaming mode, the terminal must go into store-and-play mode on the voice connection established, step 35*a*. In both cases the mode selected can be indicated to the user.

If using streaming mode, the terminal examines at certain intervals whether the communications connection is active or not, step 36*b*. Especially this is done when such a long time has expired from the last transferred voice data packet that a release according to TBF is to be expected. If the communications connection is not active, the process moves on to step 38 in which the communications connection is terminated. This is followed by step 39 where the terminal in question is idle.

If in step 36*b* it is found that the communications connection is still active, the quality information and transfer parameters of the connection are advantageously at the same time updated. The process then returns to step 34 in which the capacity of the communications connection is re-evaluated. If this evaluation shows that the QoS of the communications connection has changed so much that streaming mode cannot be used any more, a decision is made to apply a voice connection according to the store-and-play mode, step 35*a*. If, however, the evaluation 34 shows that the QoS is sufficient for streaming mode, the process again moves on to step 35*b*.

It may also be necessary to update the connection parameters in conjunction with an ordinary handover because the new cell may be implemented using some other manufacturer's equipment that do not support the functional characteristics required by the terminal. This may result in a change in the communications mode used.

If, however, the store-and-play mode is adopted, step 35*a*, the activity of the communications connection is also checked once in a while, step 36*a*. If the connection is found to be inactive, the process moves on to step 38 and eventually to the idle state 39. If, on the other hand, the connection is still active, the connection quality information and transfer parameters are advantageously updated in step 37*a*. After that the process returns to step 34 in which the quality of service of the connection is re-evaluated. If necessary, the terminal or the user thereof can be informed about the possibility of changing the quality of service of the connection to streaming mode.

The steps of the method described in conjunction with FIG. 3 are advantageously implemented by means of a software application stored at the terminal.

The exemplary method steps depicted in FIG. 3 may naturally be implemented at a VSS server 14 as far as decision-making is concerned. In this embodiment the terminals participating in the communications session follow the voice connection mode instructions received from the VSS server 14.

Above it was described some preferred embodiments of the method according to the invention, network arrangement according to the invention and terminal applicable in the network arrangement according to the invention. The invention is here described with examples from the GPRS network. The invention is not, however, limited to the embodiments described, but it can be applied in any packet-switched network that can utilize different communications modes. The method according to the invention can also be used in the optimal selection or changing of other modes or communications protocols used by the terminal. Furthermore, the inventional idea can be applied in numerous ways within the scope defined by the claims attached hereto.

The invention claimed is:

1. A method comprising:
  requesting a voice communications connection to a second mobile terminal by a first mobile terminal connected to a serving wireless general packet radio service packet-switched communications network;
  receiving, by the first mobile terminal, information describing the requested voice communications connection from one of the serving wireless general packet radio service packet-switched communications network or the second mobile terminal before establishing the requested voice communications connection; and
  selecting as a packet-switched transmission mode between the first mobile terminal and the second mobile terminal in the serving wireless general packet radio service packet-switched communications network either a real-time streaming transmission mode or a non-real-time store-and-play transmission mode on the basis of the received information, wherein a decision about the transmission mode to be used is made at the first mobile terminal on the basis of the information received from the one of the serving wireless general packet radio service packet-switched communications network or the second mobile terminal.

2. The method according to claim 1, wherein before making a decision about the transmission mode the first mobile terminal receives information describing the service capacity of the serving wireless general packet radio service packet-switched communications network, comprising at least one of the following: traffic class of the voice communications connection to be established, quality of service level of the voice communications connection, load situation of the serving wireless general packet radio service packet-switched communications network, temporary bit flow procedure of the serving wireless general packet radio service packet-switched communications network, quality level of the radio link used, or the bit error rate of packets delivered.

3. The method according to claim 2, wherein before making the decision about the transmission mode the first mobile terminal further receives from a server in the serving wireless general packet radio service packet-switched communications network information describing a service capacity of the voice communications connection between the serving wireless general packet radio service packet-switched communications network serving the first mobile terminal and the second mobile terminal, to which the voice communications connection is to be established.

4. The method according to claim 3, wherein a decision about the transmission mode is made before establishing the voice communications connection.

5. The method according to claim 4, wherein a decision is made in one of the following manners: the first mobile terminal makes the decision, a user makes the decision, or the user confirms the decision made by the first mobile terminal.

6. The method according to claim 3, wherein a decision about the transmission mode is made after a service capacity information update made on the voice communications connection.

7. A serving wireless general packet radio service packet-switched communications network comprising:
   a backbone network whose service capacity varies locally or temporally,
   servers connected with the backbone network;
   wireless terminals connected to the serving wireless general packet radio service packet-switched communications network, each of the wireless terminals configured to receive information or instructions concerning a requested voice communications connection from a server controlling a certain service in the serving wireless general packet radio service packet-switched communications network and from one of the serving wireless general packet radio service packet-switched communications network or another of the wireless terminals; and
   a functional element configured to
   make a decision about a transmission mode to be used on the basis of serving wireless general packet radio service packet-switched communications network information received before establishing a voice communications connection between a first wireless terminal and a second wireless terminal of the wireless terminals and after a voice communications connection request is received from the first wireless terminal, and
   determine whether a real-time streaming transmission mode or a non-real-time transmission store-and-play mode is to be used for each of the first wireless terminal and the second wireless terminal.

8. The serving wireless general packet radio service packet-switched communications network according to claim 7, wherein the first wireless terminal of the serving wireless general packet radio service packet-switched communications network is configured to make a decision, after the voice communications connection request, about the transmission mode to be used on the basis of the serving wireless general packet radio service packet-switched communications network information received by the first wireless terminal.

9. The serving wireless general packet radio service packet-switched communications network according to claim 8, wherein before making the decision about the transmission mode the first wireless terminal is configured to receive information describing the service capacity of the serving wireless general packet radio service packet-switched communications network serving said first wireless terminal, comprising at least one of the following: traffic class of the request voice communications connection to be established, quality of service level of the connection, load situation of the serving general packet radio service network, temporary bit flow procedure of the serving general packet radio service network, quality level of the radio link used, or the bit error rate of packets delivered.

10. The serving wireless general packet radio service packet-switched communications network according to claim 9, wherein before making the decision about the transmission mode the first wireless terminal further is configured to receive from a server in the serving wireless general packet radio service packet-switched communications network information describing the service capacity of the requested voice communications connection between the serving wireless general packet radio service packet-switched communications network serving the connection-requesting terminal and the second wireless terminal, with which said first wireless terminal has requested the voice communications connection.

11. The serving wireless general packet radio service packet-switched communications network according to claim 10, wherein the decision about the transmission mode is configured to be made after a service capacity information update made on the voice communications connection.

12. An apparatus comprising:
   a receiver through which the apparatus is configured to receive information describing a voice communications connection from a serving wireless general packet radio service packet-switched communications network and from a server controlling a certain service in the serving wireless general packet radio service packet-switched communications network;
   a transmitter;
   a user interface; and
   a control unit configured to make a decision before establishing a requested voice communications connection made by the apparatus as to whether a real-time streaming mode or a non-real-time store-and-play transmission mode is to be used on the voice communications connection on the basis of the information received, the control unit being configured to control the receiver, the transmitter, and the user interface.

13. The apparatus according to claim 12, wherein the apparatus is configured to receive information describing a service capacity of the serving wireless general packet radio service packet-switched communications network serving the apparatus, comprising at least one of the following: traffic class of the voice communications connection to be established, quality of service level of the voice communications connection, load situation of the serving wireless general packet radio service packet-switched communications network, temporary bit flow procedure of the serving general packet radio service network, quality level of the radio link used, or the bit error rate of packets delivered before making the decision about the transmission mode.

14. The apparatus according to claim 13, wherein the apparatus is a first apparatus, wherein the first apparatus is further configured to receive from a server in the serving wireless general packet radio service packet-switched communications network information describing the service capacity of the voice communications connection between the serving wireless general packet radio service packet-switched communications network serving the first apparatus and a second apparatus, with which said first apparatus has requested a voice communications connection, before making the decision about the transmission mode.

15. The apparatus according to claim 14, wherein the decision about the transmission mode is made after a service capacity information update is made on the voice communications connection.

16. A server connected with a wireless packet-switched communications network, the server comprising:
a processor; and
a memory,
the processor, in conjunction with the memory, being configured to:
store information describing a service capacity of service operators connected with a wireless packet-switched communications network,
store terminal-specific information describing a quality of a voice communications connection to a terminal connected to the wireless packet-switched communications network, and
convey the stored information describing the quality of the voice communications connection and/or the service capacity of service operators to the terminal for selecting or changing the transmission mode of the terminal between a real-time and a non-real-time transmission mode on the basis of information received from the wireless packet-switched communications network describing the requested voice communications connection.

17. The server according to claim 16, wherein the server is configured so as to convey the stored information describing the quality of the voice communications connection after a connection request.

18. The server according to claim 16, wherein the server is configured so as to convey the stored information describing the quality of the voice communications connection after a communications connection update.

19. An apparatus comprising:
means for receiving information describing a voice communications connection from a serving wireless general packet radio service packet-switched communications network and from a server controlling a certain service in the serving wireless general packet radio service packet-switched communications network;
means for transmitting;
means for interfacing by a user; and
means for controlling configured to make a decision before establishing a requested voice communications connection made by the apparatus as to whether a real-time streaming transmission mode or a non-real-time store-and-play transmission mode is to be selected and used by the apparatus on the voice communications connection on the basis of the information received, the means for controlling being configured to control the means for receiving, the means for transmitting, and the means for interfacing.

20. The apparatus according to claim 19, wherein the apparatus is configured to receive information describing a service capacity of the serving wireless general packet radio service packet-switched communications network serving the apparatus, comprising at least one of the following: traffic class of the voice communications connection to be established, quality of service level of the voice communications connection, load situation of the serving wireless general packet radio service packet-switched communications network, temporary bit flow procedure of the serving general packet radio service network, quality level of the radio link used, or the bit error rate of packets delivered before making the decision about the transmission mode.

21. The apparatus according to claim 20, wherein the apparatus is further configured to receive from a server in the serving wireless general packet radio service packet-switched communications network information describing the service capacity of the voice communications connection between the serving wireless general packet radio service packet-switched communications network serving the connection-requesting apparatus and a second apparatus, with which said apparatus has requested the voice communications connection, before making the decision about the transmission mode.

22. The apparatus according to claim 21, wherein the decision about the transmission mode is made prior to the establishment of the requested voice communications connection.

23. The apparatus according to claim 21, wherein the decision about the transmission mode is made after a service capacity information update is made on the requested voice communications connection.

* * * * *